United States Patent
Woo et al.

(10) Patent No.: US 9,898,853 B2
(45) Date of Patent: Feb. 20, 2018

(54) RENDERING APPARATUS AND METHOD

(71) Applicant: Samsung Electronics Co., Ltd., Suwon-si (KR)

(72) Inventors: Sangoak Woo, Anyang-si (KR); Minsu Ahn, Anyang-si (KR); Changmoo Kim, Seoul (KR); Seungin Park, Yongin-si (KR); Haewoo Park, Seoul (KR); Soojung Ryu, Hwaseong-si (KR); Hyongeuk Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/688,168

(22) Filed: Apr. 16, 2015

(65) Prior Publication Data
US 2016/0063752 A1    Mar. 3, 2016

(30) Foreign Application Priority Data
Sep. 1, 2014 (KR) .......................... 10-2014-0115686

(51) Int. Cl.
*G06T 15/00* (2011.01)
*G06T 3/40* (2006.01)

(52) U.S. Cl.
CPC .......... *G06T 15/005* (2013.01); *G06T 3/4076* (2013.01)

(58) Field of Classification Search
CPC . G06T 5/002; G06T 3/40; G06T 11/00; G06T 15/005; G06T 2200/12; G06T 3/4053; G06T 3/4007; G06T 3/4092; G06T 2207/20016; H04N 19/59; H04N 21/234363; H04N 9/3188; H04N 7/0102; G09G 2340/0407; G09G 5/005
See application file for complete search history.

(56) References Cited

U.S. PATENT DOCUMENTS

| | | | |
|---|---|---|---|
| 8,059,144 B2 | 11/2011 | Faye-Lund et al. | |
| 2010/0265259 A1* | 10/2010 | Faye-Lund | G06T 3/40 345/506 |
| 2013/0027431 A1* | 1/2013 | Chu | G06F 3/1446 345/644 |
| 2013/0293550 A1* | 11/2013 | Cardno | G06T 13/80 345/428 |

(Continued)

FOREIGN PATENT DOCUMENTS

| | | |
|---|---|---|
| JP | 2011-129123 A | 6/2011 |
| JP | 4777185 B2 | 9/2011 |

(Continued)

OTHER PUBLICATIONS

Lipchak, B. "OpenGL ES Version 3.0," The Khronos Group Inc., Aug. 6, 2012 (pp. 1-347).

(Continued)

*Primary Examiner* — Haixia Du
(74) *Attorney, Agent, or Firm* — F. Chau & Associates, LLC

(57) ABSTRACT

A rendering method includes receiving resolution information including an optimal resolution for rendering images constituting a frame, a number of multi-samples, and resolution factors of the respective images, rendering the images at the optimal resolution, and adjusting a resolution of each of the rendered images based on the resolution factors and the number of multi-samples.

19 Claims, 7 Drawing Sheets

(56) References Cited

U.S. PATENT DOCUMENTS

2014/0327696 A1* 11/2014 Pomianowski ......... G06T 11/40
           345/611
2015/0245063 A1*  8/2015 Rusanovskyy ...... H04N 19/597
           375/240.12

FOREIGN PATENT DOCUMENTS

| KR | 10-1227155 B1 | 1/2013 |
|----|---------------|--------|
| KR | 10-2014-0023386 A | 2/2014 |
| WO | WO 2013/081383 A1 | 6/2013 |

OTHER PUBLICATIONS

L. Yang, et al., "Geometry-Aware Framebuffer Level of Detail," *Eurographics Symposium on Rendering*, vol. 27, No. 4, 2008 (6 pages, in English).

Extended European Search Report dated on Jan. 20, 2016, in couterpart European Application No. 15176628.4 (7 pages, in English).

"Direct3D 11 Features". [Oct. 2009] https://msdn.microsoft.com . Nov. 14, 2016. <https://msdn.microsoft.com/en-us/library/windows/desktop/ff476342(v=vs.85).aspx>.

Segal, Mark et al. "The OpenGL Graphics System: A Specification". Mar. 19, 2014.

Leech, Jon. "OpenGL ES". Nov. 3, 2016.

\* cited by examiner

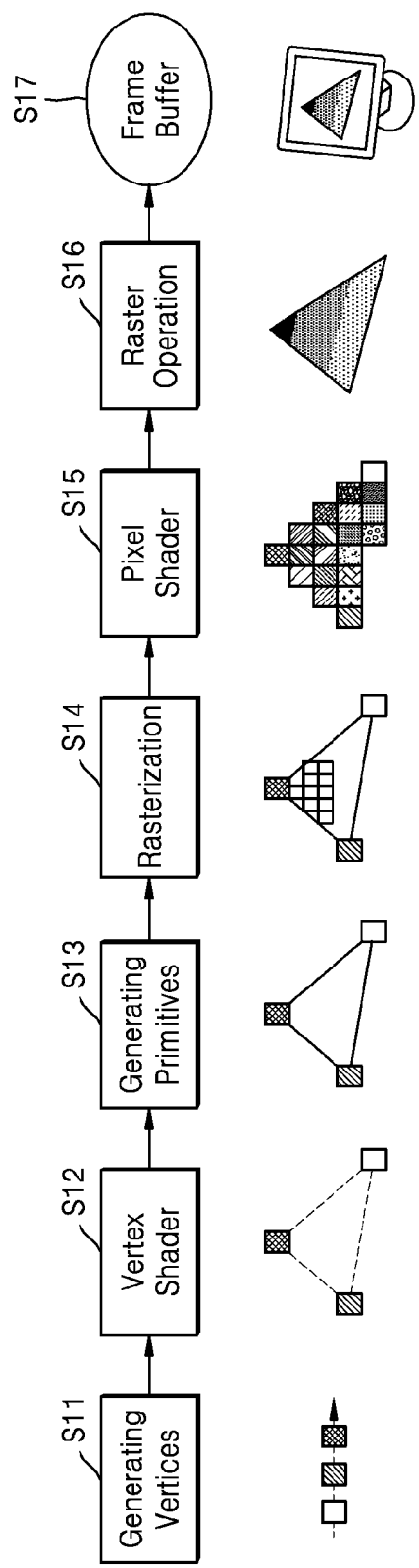

FIG. 2

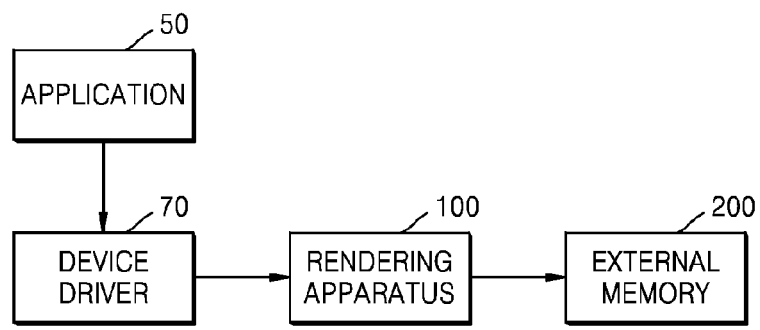

FIG. 3

|  | TRANSFER THROUGH API<br>(Application → Device Driver) |
|---|---|
| FIRST SCHEME | OPTIMAL RESOLUTION<br>RESOLUTION FACTOR FOR EACH IMAGE<br>NUMBER OF MULTI-SAMPLES |
| SECOND SCHEME | REQUIRED RESOLUTION FOR EACH IMAGE<br>RESOLUTION FACTOR FOR EACH IMAGE<br>NUMBER OF MULTI-SAMPLES |
| THIRD SCHEME | REQUIRED RESOLUTION FOR EACH IMAGE<br>OPTIMAL RESOLUTION |
| FOURTH SCHEME | REQUIRED RESOLUTION FOR EACH IMAGE |

| IMAGE | OPTIMAL RESOLUTION | RESOLUTION FACTOR | NUMBER OF MULTI-SAMPLES | NUMBER OF MULTI-SAMPLES/ RESOLUTION FACTOR |
|---|---|---|---|---|
| FIRST IMAGE | | 1 | | 4 |
| SECOND IMAGE | HD/4 | 1 | 4 | 4 |
| THIRD IMAGE | ※HD:1280x720 | 4 | | 1 |

FIG. 9

| IMAGE | REQUIRED RESOLUTION | OPTIMAL RESOLUTION | RESOLUTION FACTOR | NUMBER OF MULTI-SAMPLES |
|---|---|---|---|---|
| FIRST IMAGE | HD/4 | HD/4 | 1 | 4 |
| SECOND IMAGE | HD/4 | | 1 | |
| THIRD IMAGE | HD ※HD:1280x720 | | 4 | |

RENDERING APPARATUS AND METHOD

CROSS REFERENCE TO RELATED APPLICATION

This application claims the benefit under 35 USC 119(a) of Korean Patent Application No. 10-2014-0115686, filed on Sep. 1, 2014, in the Korean Intellectual Property Office, the entire disclosure of which is incorporated herein by reference for all purposes.

BACKGROUND

1. Field

The following description relates to a rendering apparatus and a rendering method.

2. Description of Related Art

Examples of three-dimensional (3D) graphics application program interfaces (API) include OpenGL, OpenGL ES, and Direct 3. The API's include a method of rendering each frame and displaying an image. When each frame is rendered, many operations are performed and power consumption is high. Therefore, for efficient rendering, it may be necessary to reduce an operation amount and a memory bandwidth for storing frames.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a rendering method including receiving resolution information including an optimal resolution for rendering images constituting a frame, a number of multi-samples, and resolution factors of the respective images, rendering the images at the optimal resolution, and adjusting a resolution of each of the rendered images based on the resolution factors and the number of multi-samples.

The rendering may include shading pixels of the images at the optimal resolution, and performing multi-sampling such that each of the pixels includes as many samples as the number of multi-samples.

The adjusting may include merging, into a pixel, a predetermined number of samples included in one of the rendered images, based on a corresponding one of the resolution factors and the number of multi-samples.

The adjusting may further include determining an arithmetic average of the predetermined number of samples as a pixel value of the merged pixel.

The predetermined number of samples may be equal to a value obtained by dividing the number of multi-samples by the corresponding one of the resolution factors.

In another general aspect, there is provided a rendering method including receiving required resolutions of respective images constituting a frame, extracting any one or any combination of an optimal resolution for rendering the images, resolution factors of the respective images, and a number of multi-samples, based on the required resolutions, rendering the images at the optimal resolution, and adjusting a resolution of each of the rendered images based on the resolution factors and the number of multi-samples.

The extracting may include calculating a greatest common divisor resolution of the required resolutions, and extracting the greatest common divisor resolution as the optimal resolution.

The extracting may include extracting a smallest resolution from the required resolutions as the optimal resolution.

The extracting may include extracting, as the resolution factors, values obtained by dividing the required resolutions by the optimal resolution, and extracting the number of multi-samples based on a greatest value among the resolution factors.

In still another general aspect, there is provided a rendering apparatus including a resolution information processing unit configured to receive resolution information including an optimal resolution for rendering images constituting a frame, a number of multi-samples, and resolution factors of the respective images, a rendering unit configured to render the images at the optimal resolution, and a resolution adjusting unit configured to adjust a resolution of each of the rendered images based on the resolution factors and the number of multi-samples.

The rendering unit may be configured to shade pixels of the images at the optimal resolution, and perform multi-sampling such that each of the pixels includes as many samples as the number of multi-samples.

The resolution adjusting unit may be configured to merge, into a pixel, a predetermined number of samples included in one of the rendered images, based on a corresponding one of the resolution factors and the number of multi-samples.

The resolution adjusting unit may be further configured to determine an arithmetic average of the predetermined number of samples as a pixel value of the merged pixel.

In yet another general aspect, there is provided a rendering apparatus including a resolution information processing unit configured to receive required resolutions of respective images constituting a frame, and extract any one or any combination of an optimal resolution for rendering the images, resolution factors of the respective images, and a number of multi-samples, based on the required resolutions, a rendering unit configured to render the images at the optimal resolution, and a resolution adjusting unit configured to adjust a resolution of each of the rendered images based on the resolution factors and the number of multi-samples.

The resolution information processing unit may be configured to calculate a greatest common divisor resolution of the required resolutions, and extract the greatest common divisor resolution as the optimal resolution.

The resolution information processing unit may be configured to extract a smallest resolution from the required resolutions as the optimal resolution.

The resolution information processing unit may be configured to extract, as the resolution factors, values obtained by dividing the required resolutions by the optimal resolution, and extract the number of multi-samples based on a greatest value among the resolution factors.

In still another general aspect, there is provided a rendering apparatus including a resolution information processing unit configured to receive resolution information of images constituting a frame, a rendering unit configured to render the images at an optimal resolution for rendering the images, the optimal resolution being determined based on the resolution information, and a resolution adjusting unit configured to adjust a resolution of each of the rendered images based on resolution factors of the respective images and a number of multi-samples, the resolution factors and the number of multi-samples being determined based on the resolution information.

The resolution information may include the optimal resolution, the resolution factors, and the number of multi-samples.

The resolution information may include required resolutions of the respective images, and the resolution information processing unit may be further configured to extract any one or any combination of the optimal resolution, the resolution factors, and the number of multi-samples, based on the required resolutions.

Other features and aspects will be apparent from the following detailed description, the drawings, and the claims.

BRIEF DESCRIPTION OF THE DRAWINGS

FIG. 1 is a diagram illustrating a three-dimensional (3D) image rendering process.

FIG. 2 is a block diagram illustrating an example of a rendering system.

FIG. 3 is a diagram illustrating an example of schemes for providing resolution information to a device driver via an application.

FIG. 9 is a reference diagram illustrating the other example of the rendering method of FIG. 8.

DETAILED DESCRIPTION

Figure 4:
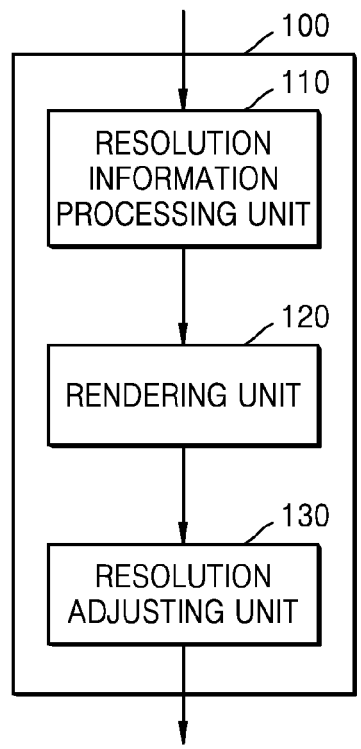
FIG. 4 is a block diagram illustrating an example of a rendering apparatus.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating a three-dimensional (3D) image rendering process. Referring to FIG. 1, the 3D image rendering process includes operations S11 to S17. Also, figures in a lower part of FIG. 1 conceptually represent processing of vertices or pixels in each operation.

Operation S11 is an operation of generating vertices representing an image. The vertices are generated to represent objects included in the image.

Operation S12 is an operation of shading the generated vertices. A vertex shader may designate a color of the vertices generated in operation S11, and shade the vertices.

Operation S13 is an operation of generating primitives. A primitive represents a polygon formed by points, lines, or vertices. For example, a primitive may represent a triangle formed by connecting vertices.

Operation S14 is an operation of rasterizing the primitives. Rasterizing the primitives refers to dividing each of the primitives into a plurality of fragments. The fragment is a constituent unit of the primitive, and may be a basic unit for image processing. The primitive includes only information of the vertices. Thus, interpolation is performed to generate the fragments between the vertices in the rasterization operation.

Operation S15 is an operation of shading pixels. Although FIG. 1 illustrates that shading is performed on a pixel-by-pixel basis, shading may also be performed on a fragment-by-fragment basis. For example, shading the pixels or the fragments refers to designating a color of the pixels or the fragments.

Operation S16 is a raster operation. In the raster operation, color blending and a depth test are performed to generate a raster image (pixels or samples) based on information of the shaded pixels. The generated raster image is output to a frame buffer.

Operation S17 is an operation of displaying a frame stored in the frame buffer. A frame generated through operations S11 to S16 is stored in the frame buffer. The frame stored in the frame buffer is displayed on a display unit.

When a plurality of images constituting a frame is rendered, resolutions (i.e., required resolutions) respectively required for the plurality of images may be different from each other. For example, in a case of radiosity rendering, that is, a rendering scheme for representing a reflection of light, three types of images (e.g., a color image, a normal image, and a depth image) are simultaneously output to generate a final image (a final frame). In this case, a required resolution required for the color image and the normal image may be about 640×360 (nHD), and a required resolution required for the depth image may be about 1280×720 (HD).

However, due to limitations of an application program interface (API), all of the images are rendered at the same resolution in the pixel shading operation. Thus, when a plurality of images is simultaneously output, if resolutions respectively required for the plurality of images are different from each other, it is necessary to adjust the resolution of each of the plurality of images.

A rendering apparatus according to examples described herein may adjust a plurality of images to have required resolutions respectively corresponding thereto prior to outputting the images. Hereinafter, the rendering apparatus and a rendering system including the rendering apparatus will be described in detail with reference to the accompanying drawings.

FIG. 2 is a block diagram illustrating an example of a rendering system. Referring to FIG. 2, the rendering system includes an application 50, a device driver 70, the rendering apparatus 100, and an external memory 200.

The application 50 provides resolution information of a plurality of images to the device driver 70 through an API. In this example, the API may be OpenGL, OpenGL ES, or Direct 3. The resolution information of the plurality of images may include at least one of required resolutions respectively corresponding to the plurality of images, an optimal resolution for rendering the plurality of images, resolution factors respectively corresponding to the plurality of images, and a number of multi-samples.

Herein, the required resolutions respectively corresponding to the plurality of images refer to resolutions respectively required for the plurality of images, and the resolutions respectively required for the plurality of images may be different from each other. For example, when the plurality of images to be rendered include a first image and a second image, a resolution of about 640×360 may be required for the first image, and a resolution of about 1280×720 may be required for the second image.

Also, the optimal resolution is a resolution that is calculated based on the required resolutions respectively corresponding to the plurality of images. For example, the optimal resolution may be the greatest common divisor resolution among the required resolutions, or the smallest resolution among the required resolutions. However, examples are not limited thereto.

Also, the resolution factors respectively corresponding to the plurality of images are equal to values obtained by dividing the required resolutions of the respective images by the optimal resolution. For example, when the required resolution of the first image among the plurality of images is Wo×Ho and the optimal resolution is Wr×Hr, a resolution factor RF of the first image is Sw×Sh, where Sw=Wo/W and Sh=Ho/Hr.

Also, the number of multi-samples is determined based on the resolution factors respectively corresponding to the plurality of images and a number of multi-samples supported by the rendering apparatus 100. For example, the greatest value (a first value) among the resolution factors corresponding to the number of multi-samples supported by the rendering apparatus 100, may be the number of multi-samples.

On the other hand, when the greatest value (a second value) among the resolution factors does not correspond to the number of multi-samples supported by rendering apparatus 100, the smallest value among values greater than the second value among the number of multi-samples supported by the rendering apparatus 100 may be the number of multi-samples.

FIG. 3 is a diagram illustrating an example of schemes for providing resolution information to the device driver 70 via the application 50. Referring to FIG. 3, the application 50 may provide the resolution information to the device driver 70 via four schemes. However, examples are not limited thereto. For example, in a first scheme, the application 50 provides, to the device driver 70, an optimal resolution, a resolution factor for each of a plurality of images, and a number of multi-samples.

Also, in a second scheme, the application 50 provides, to the device driver 70, a required resolution for each of the plurality of images, the resolution factor for each of the plurality of images, and the number of multi-samples.

Also, in a third scheme, the application 50 provides, to the device driver 70, the required resolution for each of the plurality of images and the optimal resolution.

Also, in a fourth scheme, the application 50 provides, to the device driver 70, the required resolution for each of the plurality of images.

Referring to FIG. 2, the device driver 70 converts the resolution information, which is received from the application 50, into an instruction processable by the rendering apparatus 100 (e.g., a graphic processing unit (GPU)), and transmits the same to the rendering apparatus 100.

The rendering apparatus 100 renders the plurality of images based on the resolution information received from the device driver 70. Also, the rendering apparatus 100 outputs the rendered images to the external memory 200. The rendering apparatus 100 will be described in detail with reference to FIG. 4.

The external memory 200 may be a frame buffer, and the plurality of images rendered by the rendering apparatus 100 may be stored in the external memory 200.

FIG. 4 is a block diagram illustrating an example of the rendering apparatus 100. Referring to FIG. 4, the rendering apparatus 100 includes a resolution information processing unit 110, a rendering unit 120, and a resolution adjusting unit 130.

For example, as in the first scheme illustrated in FIG. 3, the resolution information processing unit 110 may receive resolution information including an optimal resolution for rendering a plurality of images, resolution factors respectively corresponding to the plurality of images, and a number of multi-samples.

Also, as in the second scheme illustrated in FIG. 3, when the resolution information processing unit 110 receives resolution information including required resolutions respectively corresponding to the plurality of images, the resolution factors respectively corresponding to the plurality of images, and the number of multi-samples, the resolution information processing unit 110 may calculate the optimal resolution based on the required resolutions. For example, the resolution information processing unit 110 may calculate the optimal resolution Wr (=Wo/Sw)×Hr (=Ho/Sh) by dividing the required resolution Wo×Ho of an image by the resolution factor RF (=Sw×Sh) of the image.

In this example, when the resolution factor RF is given, the resolution information processing unit 110 may extract Sw and Sh by referring to the following resolution factor table.

TABLE 1

| | RF | | | | | |
|---|---|---|---|---|---|---|
| | 1 | 2 | 4 | 8 | 16 | 32 |
| Sw | 1 | 1 | 2 | 2 | 4 | 4 |
| Sh | 1 | 2 | 2 | 4 | 4 | 8 |

For example, when the resolution factor RF is 4, Sw=2 and Sh=2 may be extracted. However, Table 1 is an example, and the resolution factor table may be set in various ways.

Also, as in the third scheme illustrated in FIG. 3, when the resolution information processing unit 110 receives resolution information including the required resolutions respectively corresponding to the plurality of images and the optimal resolution, the resolution information processing unit 110 may calculate the resolution factors respectively corresponding to the plurality of images and the number of multi-samples. For example, the resolution information processing unit 110 may calculate the resolution factor Sw (=Wo/Wr)×Sh (=Ho/Hr) by dividing the required resolution Wo×Ho of the image by the optimal resolution Wr×Hr of the image. Also, when the greatest value (a first value) among the calculated resolution factors corresponds to a number of multi-samples supported by the rendering apparatus 100, the resolution information processing unit 110 may extract the first value as the number of multi-samples. On the other hand, when the greatest value (a second value) among the resolution factors does not correspond to the number of multi-samples supported by the rendering apparatus 100, the resolution information processing unit 110 may extract the smallest value among values greater than the second value among the number of multi-samples supported by the rendering apparatus 100, as the number of multi-samples.

Also, as in the fourth scheme illustrated in FIG. 3, when the resolution information processing unit 110 receives resolution information including the required resolutions respectively corresponding to the plurality of images, the resolution information processing unit 110 may calculate the optimal resolution and the resolution factors respectively corresponding to the plurality of images, based on the required resolutions. The resolution information processing unit 110 may calculate the greatest common divisor resolution of the required resolutions respectively corresponding to the plurality of images, and extract the greatest common divisor resolution as the optimal resolution. When the greatest common divisor resolution of the required resolutions is not calculated, the resolution information processing unit 110 may extract the smallest resolution among the required resolutions as the optimal resolution. However, examples are not limited thereto.

For example, when the plurality of images include first to third images, the required resolution of the first image is 1280×720 (a first resolution), and the required resolutions of the second and third images are 640×360 (second and third resolutions), the resolution information processing unit 110 may extract the greatest common divisor 640×360 of 1280× 720 as the optimal resolution.

Also, the resolution information processing unit 110 may calculate the resolution factors and the number of multi-samples based on the required resolutions and the extracted optimal resolution. Since a method of calculating the resolution factors and the number of multi-samples has been described in detail in the third scheme, a detailed description thereof is omitted herein.

The rendering unit 120 divides an image into a plurality of tiles, performs rendering on a tile-by-tile basis, and stores the rendered tiles in a tile buffer. Also, the rendering unit 120 renders the plurality of images at the optimal resolution. In this example, the optimal resolution may be a resolution included in the resolution information received from an external device (e.g., the device driver 70), or may be a resolution calculated based on the resolution information received from the external device.

Also, the rendering unit 120 may perform pixel shading a number of times determined based on the optimal resolution. For example, when the optimal resolution is 640×360, the rendering unit 120 may perform pixel shading 640×360 times in order to render an image.

Also, the rendering unit 120 may perform multi-sampling on the shaded pixels. The multi-sampling refers to sampling data at a plurality of positions included in a shaded pixel. For example, at the plurality of positions included in the shaded pixel, the rendering unit 120 may acquire a plurality of pieces of data (sample values) of the pixel by performing a depth test based on depth value information, color blending, and a visibility test.

In this example, the number of multi-samples (i.e., the number of samples that are multi-sampled and included in a pixel) may be included in the resolution information received from an external device (e.g., the device driver 70), or may be calculated based on the resolution information received from the external device. The rendering unit 120 may perform multi-sampling based on the number of multi-samples. For example, when the number of multi-samples is 4, the rendering unit 120 may acquire a sample value at each of four positions in a pixel.

The resolution adjusting unit 130 merges a predetermined number of samples included in the rendered image into a pixel based on a resolution factor corresponding to the rendered image (tile) and the number of multi-samples. The resolution adjusting unit 130 may merge, into a pixel, as many samples as a number obtained by dividing the number of multi-samples by the resolution factor corresponding to the rendered image.

For example, when a resolution factor corresponding to the rendered first image (tile) is 1 and the number of multi-samples is 4, the resolution adjusting unit 130 may merge four samples included in the first image into a pixel. Accordingly, a number of pixels in a final image of the first image is equal to a number obtained by dividing a number of samples included in the first image by 4. Also, the resolution adjusting unit 130 may calculate an arithmetic average of four samples, and determine the calculated arithmetic average as a pixel value of the merged pixel.

The resolution adjusting unit 130 adjusts a resolution of the tiles included in the plurality of images to the required resolutions, and may output the resolution-adjusted tiles to the external memory 200 of FIG. 2.

Figure 5:
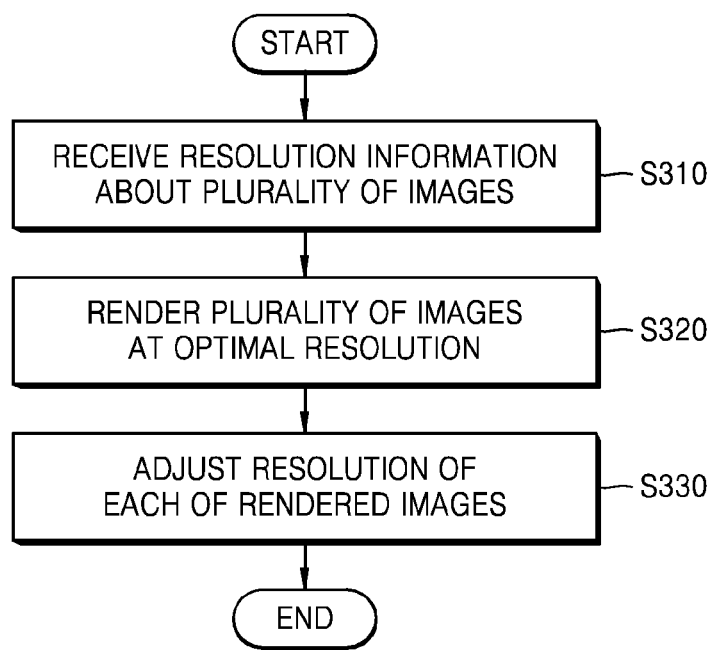
FIGS. 5 and 6 are flowcharts illustrating an example of a rendering method.
Figure 6:
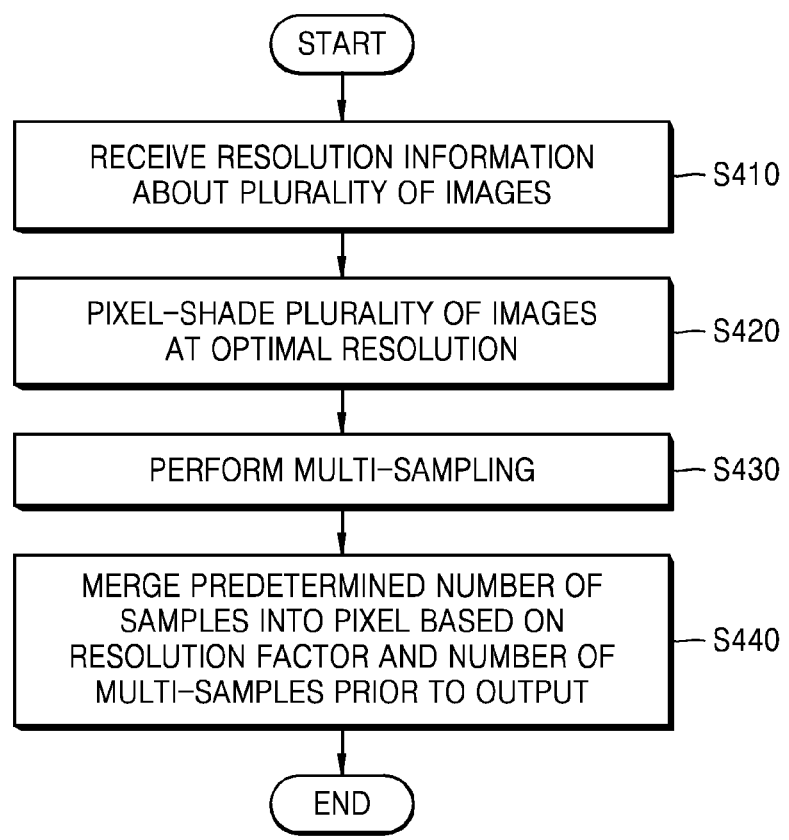
Figures 7A, 7B:
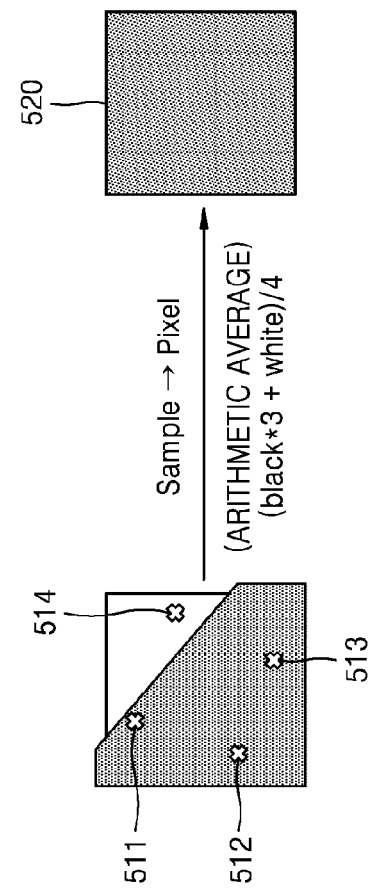
FIGS. 7A and 7B are reference diagrams illustrating the example of the rendering method of FIGS. 5 and 6.

FIGS. 5 and 6 are flowcharts illustrating an example of a rendering method. FIGS. 7A and 7B are reference diagrams illustrating the example of the rendering method of FIGS. 5 and 6.

Operations S420 and S430 of FIG. 6 are detailed operations of Operation S320 of FIG. 5, and Operation S440 of FIG. 6 is a detailed operation of Operation S330 of FIG. 5.

Referring to FIGS. 5 and 6, in operations S310 and S410, the rendering apparatus 100 receives resolution information about a plurality of images.

For example, as illustrated in FIG. 7A, the rendering apparatus 100 receives resolution information including an optimal resolution for rendering first to third images, resolution factors of the respective first to third images, and a number of multi-samples from an external device (e.g., the device driver 70). In this example, the optimal resolution for rendering the first to third images may be determined based on required resolutions of the respective first to third images. For example, when the first to third images are rendered, the optimal resolution may be the greatest common divisor resolution of first to third required resolutions of the respective first to third images, or may be the smallest resolution among the first to third required resolutions. However, examples are not limited thereto.

Also, the resolution factors of the respective first to third images may be calculated based on the required resolutions of the respective first to third images and the optimal resolution. For example, a first resolution factor of the first image may be calculated by dividing the first required resolution (i.e., the required resolution of the first image, for example, 640×360) by the optimal resolution (for example, 640×360).

Also, the number of multi-samples from the external device may be determined based on the resolution factors of the first to third images and a number of multi-samples supported by the rendering apparatus 100. For example, when the greatest value among the first to third resolution factors is 4 and the number of multi-samples supported by the rendering apparatus 100 is 4, the number of multi-samples from the external device may be determined as 4. On the other hand, when the greatest value among the first to third resolution factors is 4.3 and the number of multi-samples supported by the rendering apparatus 100 is 2, 4, 8, and 16, the number of multi-samples from the external device may be determined as 8, that is, the smallest value among values (for example, 8 and 16) greater than 4.3 among 2, 4, 8, and 16.

Referring to FIG. 5, in operation S320, the rendering apparatus 100 renders the plurality of images at the optimal resolution.

Referring to FIG. 6, in operation S420, the rendering apparatus 100 pixel-shades the plurality of images at the optimal resolution. That is, the rendering apparatus 100 pixel-shades a number of times determined based on the optimal resolution. For example, when the optimal resolution is 640×360, the rendering apparatus 100 may pixel-shade 640×360 times in order to render an image, and thus, 640×360 pixels may be generated.

In operation S430, the rendering apparatus 100 performs multi-sampling on the shaded pixels. The multi-sampling refers to sampling data at a plurality of positions included in a shaded pixel. For example, at the plurality of positions included in the shaded pixel, the rendering apparatus 100 may acquire a plurality of pieces of data (sample values) of the pixel by performing a depth test based on depth value information, color blending, and a visibility test.

In this example, the rendering apparatus 100 may perform multi-sampling based on the number of multi-samples. For example, as illustrated in FIG. 7A, when the number of multi-samples is 4, the rendering apparatus 100 may acquire samples at four positions P1, P2, P3, and P4 in a pixel 510.

Thus, when the optimal resolution is 640×360 and the number of multi-samples is 4, the rendering apparatus 100 may acquire 640×360×4 samples in an image. In this example, when an image is divided into N tiles, a number of samples stored in a tile buffer may be represented as (640×360×4)/N.

Referring to FIG. 5, in operation S330, the rendering apparatus 100 adjusts a resolution of each of the rendered images.

Referring to FIG. 6, in operation S440, the rendering apparatus 100 merges a predetermined number of samples included in a rendered image into a pixel based on the resolution factor of the rendered image (tile) stored in the tile buffer and the number of multi-samples prior to output. The rendering apparatus 100 may merge, into a pixel, as many samples as a number obtained by dividing the number of multi-samples by the resolution factor of the rendered image, and may calculate a pixel value of the pixel as an arithmetic average of the merged samples.

For example, as illustrated in FIG. 7A, when the resolution factor of the rendered first image (tile) is 1 and the number of multi-samples is 4, the rendering apparatus 100 merges 4 (=4/1) samples included in the first image into a pixel. As illustrated in FIG. 7B, when first to third samples 511, 512, and 513 representing black and a fourth sample 514 representing white are merged into a first pixel 520, a pixel value of the first pixel 520 is calculated as an arithmetic average ((black×3+white)/4) of values of the first to fourth samples 511, 512, 513, and 514.

As described above, when four samples are merged into a pixel, a number of pixels in a final image of the first image is equal to the number obtained by dividing the number of multi-samples included in the first image by 4. When the number of samples of the first image is 640×360×4, since the number of pixels is 640×360, a resolution of the final image of the first image is 640×360. That is, the final image of the first image has the first required resolution (640×360) of the first image.

Also, as illustrating in FIG. 7A, when the resolution factor of the rendered third image (tile) is 4 and the number of multi-samples is 4, each of samples included in the third image is a pixel. Accordingly, a number of pixels in a final image of the third image is equal to the number of samples included in the third image. Also, when the number of samples included in the third image is 640×360×4, since the number of pixels is 1280×720, a resolution of the final image of the third image is 1280×720. That is, the final image of the third image has the third required resolution (1280×720) of the third image.

The rendering apparatus 100 may output the resolution-adjusted final images to the frame buffer.

Figure 8:
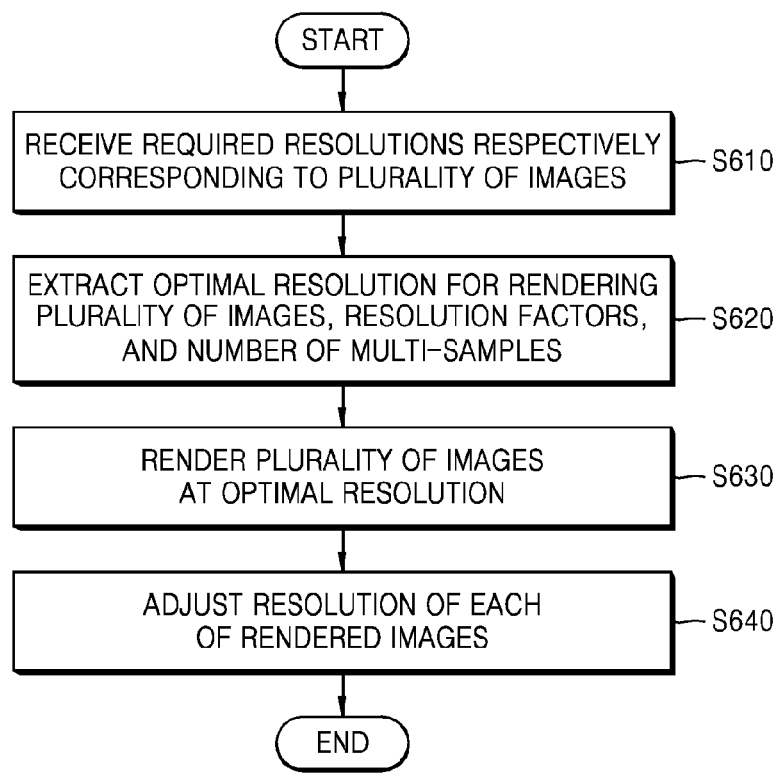
FIG. 8 is a flowchart illustrating another example of a rendering method.

FIG. 8 is a flowchart illustrating another example of a rendering method. FIG. 9 is a reference diagram illustrating the other example of the rendering method of FIG. 8.

Referring to FIG. 8, in operation S610, the rendering apparatus 100 receives required resolutions respectively corresponding to a plurality of images. Also, in addition to the required resolutions, the rendering apparatus 100 may further receive resolution factors respectively corresponding to the plurality of images and an optimal resolution for rendering the plurality of images. For example, the rendering apparatus 100 may receive first to third required resolutions respectively corresponding to first to third images from an external device (e.g., the device driver 70).

In operation S620, the rendering apparatus 100 extracts the optimal resolution, the resolution factors respectively corresponding to the plurality of images, and a number of multi-samples, based on the received required resolutions. For example, as illustrated in FIG. 9, when the first to third images are rendered, the rendering apparatus 100 may extract the greatest common divisor resolution (640×360) among the first to third required resolutions (640×360, 640×360, and 1280×720) respectively corresponding to the first to third images, or the smallest resolution among the first to third required resolutions, and determines the extracted resolution as the optimal resolution. However, examples are not limited thereto.

Also, the rendering apparatus 100 may calculate the resolution factor corresponding to each of the plurality of images, based on the required resolution and the optimal resolution. For example, as illustrated in FIG. 9, the rendering apparatus 100 may calculate a first resolution factor (for example, 1) corresponding to the first image by dividing the first required resolution (i.e., the required resolution of the first image, for example, 640×360) by the optimal resolution (for example, 640×360). Also, the rendering apparatus 100 may calculate a third resolution factor (for example, 4) corresponding to the third image by dividing the third required resolution (i.e., the required resolution of the third image, for example, 1280×720) by the optimal resolution (for example, 640×360).

Also, the rendering apparatus 100 may determine the number of multi-samples based on the resolution factors. For example, as illustrated in FIG. 9, when the greatest value among the first to third resolution factors is 4 and a number of multi-samples supported by the rendering apparatus 100 is 4, the rendering apparatus 100 may determine the number of multi-samples as 4. On the other hand, when the greatest value among the first to third resolution factors is 4.3 and the number of multi-samples supported by the rendering apparatus 100 is 2, 4, 8, and 16, the number of multi-samples may be determined as 8, that is, the smallest value among values (for example, 8 and 16) greater than 4.3 among 2, 4, 8, and 16.

A method of extracting the optimal resolution, the resolution factors, and the number of multi-samples when receiving only the required resolutions respectively corresponding to the plurality of images from the external device has been described above.

However, when the rendering apparatus 100 receives information of the optimal resolution together with the required resolutions, the rendering apparatus 100 may skip an optimal resolution calculating operation, and may extract the resolution factors based on the required resolutions and the optimal resolution. Also, when the rendering apparatus 100 receives information of the resolution factors together with the required resolutions, the rendering apparatus 100 may extract the optimal resolution based on the required resolutions and the resolution factors.

Referring to FIG. 8, in operation S630, the rendering apparatus 100 renders the plurality of images at the optimal resolution. Since operation S630 of FIG. 8 corresponds to operation S320 of FIG. 5 and operations S420 and S430 of FIG. 6, a detailed description thereof is omitted herein.

In operation S640, the rendering apparatus 100 adjusts a resolution of each of the rendered images (S640). Since operation S640 of FIG. 8 corresponds to operation S330 of FIG. 5 and operation S440 of FIG. 6, a detailed description thereof is omitted herein.

Table 2 below illustrates pixel shading times (operation amount) and a memory bandwidth in an example of outputting a plurality of images at the same resolution without adjusting resolutions thereof. Table 3 below illustrates pixel shading times and a memory bandwidth in an example of outputting a plurality of images by adjusting a resolution of each of the plurality of images.

TABLE 2

| Image | Required resolution | Output resolution | Pixel shading times (operation amount) | Memory bandwidth |
|---|---|---|---|---|
| First image | 640 × 360 (HD/4) | 1280 × 720 (HD) | 1280 × 720 (HD) | 3HD |
| Second image | 640 × 360 (HD/4) | | | |
| Third image | 1280 × 720 (HD) | | | |

TABLE 3

| Image | Required resolution | Output resolution | Pixel shading times (operation amount) | Memory bandwidth |
|---|---|---|---|---|
| First image | 640 × 360 (HD/4) | 640 × 360 (HD/4) | 640 × 360 (HD/4) | 2(HD/4) + HD |
| Second image | 640 × 360 (HD/4) | 640 × 360 (HD/4) | | |
| Third image | 1280 × 720 (HD) | 1280 × 720 (HD) | | |

In Tables 2 and 3, for convenience of description, it is assumed that required resolutions of the plurality of images (first to third images) are respectively 640×360 (HD/4), 640×360 (HD/4), and 1280×720 (HD).

Referring to Table 2, when the plurality of images are output at the same resolution without adjusting the resolutions thereof, the first to third images are outputted at the greatest resolution among the required resolutions of the first to third images. For example, the first to third images are output at a resolution of 1280×720 (HD). In this example, the pixel shading times is 1280×720 (HD), and the memory bandwidth of an external memory storing the output images is 3HD.

On the other hand, referring to Table 3, when the plurality of images are output by adjusting the resolution of each of the plurality of images, the first to third images are pixel-shaded at the optimal resolution (for example, 640×360 (HD/4)) and the pixel shading times is 640×360 (HD/4). Also, since the resolution of each of the rendered first to third images are adjusted and the rendered first to third images are output at the optimal resolution, the bandwidth of the external memory storing the output images is 2(HD/4)+ HD.

The examples of the rendering methods may reduce an operation amount (i.e., pixel shading times) required to render a plurality of images of different required resolutions and a memory bandwidth required to store the plurality of images.

The various units, elements, and methods described above may be implemented using one or more hardware components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A rendering method comprising:
   receiving resolution information comprising an optimal resolution for rendering images constituting a frame, a number of multi-samples, and resolution factors of the respective images;
   rendering the images at the optimal resolution; and
   adjusting a resolution of each of the rendered images based on the resolution factors and the number of multi-samples,
   wherein the adjusting the resolution of each of the rendered images includes merging, into a pixel, a predetermined number of samples included in one of the rendered images, based on a corresponding one of the resolution factors and the number of multi-samples, and
   wherein the predetermined number of samples is equal to a value obtained by dividing the number of multi-samples by the corresponding one of the resolution factors.

2. The rendering method of claim 1, wherein the rendering comprises: shading pixels of the images at the optimal resolution; and
   performing multi-sampling such that each of the pixels comprises as many samples as the number of multi-samples.

3. The rendering method of claim 1, wherein the adjusting further comprises:
   determining an arithmetic average of the predetermined number of samples as a pixel value of the merged pixel.

4. The rendering method of claim 1, wherein the optimal resolution is based on respective resolutions of the respective images of each image comprising the frame.

5. The rendering method of claim 1, wherein at least two of the images comprising the frame overlap each other.

6. The rendering method of claim 1, wherein the images comprising the frame combine to form a final image.

7. A rendering method comprising:
   receiving required resolutions of respective images constituting a frame;
   extracting any one or any combination of an optimal resolution for rendering the images, resolution factors of the respective images, and a number of multi-samples, based on the required resolutions;
   rendering the images at the optimal resolution; and
   adjusting a resolution of each of the rendered images based on the resolution factors and the number of multi-samples,
   wherein the adjusting the resolution of each of the rendered images includes merging, into a pixel, a predetermined number of samples included in one of the rendered images, based on a corresponding one of the resolution factors and the number of multi-samples, and wherein the predetermined number of samples is equal to a value obtained by dividing the number of multi-samples by the corresponding one of the resolution factors.

8. The rendering method of claim 7, wherein the extracting comprises:
calculating a greatest common divisor resolution of the required resolutions; and
extracting the greatest common divisor resolution as the optimal resolution.

9. The rendering method of claim 7, wherein the extracting comprises:
extracting a smallest resolution from the required resolutions as the optimal resolution.

10. The rendering method of claim 7, wherein the extracting comprises:
extracting, as the resolution factors, values obtained by dividing the required resolutions by the optimal resolution; and
extracting the number of multi-samples based on a greatest value among the resolution factors.

11. The rendering method of claim 7, wherein the rendering comprises:
shading pixels of the images at the optimal resolution; and
performing multi-sampling such that each of the pixels comprises as many samples as the number of multi-samples.

12. A rendering apparatus, comprising:
one or more processors configured to:
receive predetermined resolution information comprising an optimal resolution for rendering images constituting a frame, a number of multi-samples, and resolution factors of the respective images;
render the images at the optimal resolution; and
adjust a resolution of each of the rendered images based on the resolution factors and the number of multi-samples
wherein the processors are further configured merge, into a pixel, a predetermined number of samples included in one of the rendered images, based on a corresponding one of the resolution factors and the number of multi-samples, and
wherein the predetermined number of samples is equal to a value obtained by dividing the number of multi-samples by the corresponding one of the resolution factors.

13. The rendering apparatus of claim 12, wherein the processors are further configured to:
shade pixels of the images at the optimal resolution; and
perform multi-sampling such that each of the pixels comprises as many samples as the number of multi-samples.

14. The rendering apparatus of claim 12, wherein the processors are further configured to:
determine an arithmetic average of the predetermined number of samples as a pixel value of the merged pixel.

15. A rendering apparatus, comprising:
one or more processors configured to:
receive predetermined required resolutions of respective images constituting a frame, and extract any one or any combination of an optimal resolution for rendering the images, resolution factors of the respective images, and a number of multi-samples, based on the required resolutions;
render the images at the optimal resolution; and
adjust a resolution of each of the rendered images based on the resolution factors and the number of multi-samples,
wherein the processors are further configured to merge, into a pixel, a predetermined number of samples included in one of the rendered images, based on a corresponding one of the resolution factors and the number of multi-samples, and
wherein the predetermined number of samples is equal to a value obtained by dividing the number of multi-samples by the corresponding one of the resolution factors.

16. The rendering apparatus of claim 15, wherein the processors are further configured to:
calculate a greatest common divisor resolution of the required resolutions; and
extract the greatest common divisor resolution as the optimal resolution.

17. The rendering apparatus of claim 15, wherein the processors are further configured to:
extract a smallest resolution from the required resolutions as the optimal resolution.

18. The rendering apparatus of claim 15, wherein the processors are further configured to:
extract, as the resolution factors, values obtained by dividing the required resolutions by the optimal resolution; and
extract the number of multi-samples based on a greatest value among the resolution factors.

19. The rendering apparatus of claim 15, wherein the processors are further configured to:
shade pixels of the images at the optimal resolution; and
perform multi-sampling such that each of the pixels comprises as many samples as the number of multi-samples.

* * * * *